United States Patent
Gao et al.

(10) Patent No.: US 10,525,390 B2
(45) Date of Patent: Jan. 7, 2020

(54) POWDER SINTERED METALLIC POROUS BODY, FILTER ELEMENT AND METHOD FOR IMPROVING PERMEABILITY THEREOF

(71) Applicant: Intermet Technologies Chengdu Co., Ltd., Chengdu, Sichuan (CN)

(72) Inventors: Lin Gao, Chengdu (CN); Tao Wang, Chengdu (CN); Bo Li, Chengdu (CN)

(73) Assignee: Intermet Technologies Chengdu Co., Ltd., Chengdu, Sichuan (CN)

( * ) Notice: Subject to any disclaimer, the term of this patent is extended or adjusted under 35 U.S.C. 154(b) by 402 days.

(21) Appl. No.: 14/915,177

(22) PCT Filed: Jun. 30, 2014

(86) PCT No.: PCT/CN2014/081163
§ 371 (c)(1),
(2) Date: Apr. 13, 2016

(87) PCT Pub. No.: WO2015/027746
PCT Pub. Date: Mar. 5, 2015

(65) Prior Publication Data
US 2016/0256807 A1  Sep. 8, 2016

(30) Foreign Application Priority Data
Aug. 30, 2013  (CN) .......................... 2013 1 0389695

(51) Int. Cl.
| B01D 39/20 | (2006.01) |
| B01D 71/02 | (2006.01) |
| B22F 3/11 | (2006.01) |
| C22C 19/03 | (2006.01) |
| C22C 19/00 | (2006.01) |
| B01D 69/12 | (2006.01) |

(52) U.S. Cl.
CPC ......... *B01D 39/2034* (2013.01); *B01D 69/12* (2013.01); *B01D 71/022* (2013.01); *B22F 3/11* (2013.01); *C22C 19/002* (2013.01); *C22C 19/03* (2013.01); *B01D 2325/30* (2013.01)

(58) Field of Classification Search
CPC .......... B22F 2998/10; B22F 3/11; B22F 3/02; B01D 2325/30; B01D 39/20; B01D 39/2034; B01D 69/12; B01D 71/022; C22C 19/002; C22C 19/03
See application file for complete search history.

(56) References Cited

U.S. PATENT DOCUMENTS

2009/0326279 A1* 12/2009 Tonkovich ............ B01F 5/0475
568/487
2011/0020662 A1  1/2011 Okamoto

FOREIGN PATENT DOCUMENTS

| CN | 101914707 A | 12/2010 |
| CN | 103249850 A | 8/2013 |

OTHER PUBLICATIONS

English Translation of the Written Opinion of the International Search Authority in WO 2015027746, 7 Pages, No date.*
English language translation of Zang, Chunyong, Research on the mechanical properties of nickel alloy porous materials, Chinese Theses Full-text Database, Dec. 31, 2009, 79 pages. (Year: 2009).*

* cited by examiner

*Primary Examiner* — Pranav N Patel
(74) *Attorney, Agent, or Firm* — Mersenne Law

(57) ABSTRACT

Disclosed are a powder sintered porous metal with better comprehensive properties, especially with good corrosion resistance to hydrofluoric acid, and a filter element using same. The powder sintered porous metal of the present invention has a porosity of 25-60%, an average pore diameter of 0.5-50 μm and a weight loss rate of at most 1% after being immersed into a hydrofluoric acid solution with a mass fraction of 5% at room temperature for 20 days; and the powder sintered metal porous body consists of Cu accounting for 23-40 wt %, Si accounting for 0-5% and the balance of Ni, based on the weight of the powder sintered metal porous body. The powder sintered porous metal of the present invention has good mechanical properties and machinability, and excellent corrosion resistance in acid mediums, especially in hydrofluoric acid mediums. In particular surprisingly, when Cu and Ni are introduced into the powder sintered porous metal by Cu element powders and Ni element powders doped in the raw material powders, the powder sintered porous metal has significantly improved permeability and backflushing regeneration property.

14 Claims, No Drawings

POWDER SINTERED METALLIC POROUS BODY, FILTER ELEMENT AND METHOD FOR IMPROVING PERMEABILITY THEREOF

TECHNICAL FIELD

The present invention relates to a powder sintered porous metal, a filter element using the sintered porous metal and a method for improving the permeability of the sintered porous metal.

BACKGROUND ART

In the field of inorganic membrane separation, the powder sintered porous metal is a main filter material. In general, pore structures and chemical stabilities are the most important technical indicators of such materials, wherein, pore structures are the key factors affecting the filtering precision, permeability and backflushing regeneration ability of the material, and are determined by the pores-forming means in the preparation procedure of the powder sintered metal porous material; whereas chemical stabilities are the key factors affecting the corrosion resistance of the material in a certain environmental system, and are determined by the chemical characteristics of the substances themselves.

At present, the pores-forming means, which have been applied in the preparation of the powder sintered metal porous material, mainly comprise: firstly, forming pores by chemical reactions, the mechanism of which is on the basis of the Kirkendall effect caused by the large differences in the intrinsic diffusion coefficients of different elements, thereby resulting in generating the Kirkendall pores in the materials; secondly, forming pores by the physical accumulation of raw material particles; and thirdly, forming pores by the escape of additives. The sintered porous materials generated on the basis of the different pore-forming means stated above usually have differentiated pore structures.

With the development of the membrane separation technology, it is proposed higher and higher requirements for the properties of the powder sintered metal porous material. It has become actual need to develop the powder sintered metal porous material with the excellent pore structure and chemical stability. In order to develop the powder sintered metal porous material with the excellent pore structure and chemical stability, it requires not only to seek desirable alloy components, but also to investigate the corresponding pores-forming means. Provided is the following invention on the basis of such technical background.

Contents of the Invention

First, the technical problem to be solved by the present invention is providing a powder sintered porous metal with better comprehensive properties, especially with good corrosion resistance to hydrofluoric acid, and a filter element using same.

The powder sintered porous metal of the present invention has a porosity of 25-60%, an average pore diameter of 0.5-50 μm, a weight loss rate of at most 1% after being immersed into a hydrofluoric acid solution with a mass fraction of 5% at room temperature for 20 days; and the powder sintered porous metal consists of Cu accounting for 23-40 wt %, Si accounting for 0-5 wt % and the balance of Ni, based on the weight of the powder sintered porous metal.

The powder sintered porous metal stated above can only consist of two elements of Cu and Ni, and at this time, the phase of the powder sintered porous metal is a (Cu, Ni) solid solution.

The powder sintered porous metal stated above can also consist of three elements of Cu, Si and Ni, and at this time, the weight percentage of Si in the powder sintered porous metal should not exceed 5%, wherein, the weight percentage content of Si can further preferably be 0.5-4%.

Adding Si into the powder sintered porous metal can improve its corrosion resistance, especially the corrosion resistance in an oxidizing medium system. If the weight percentage of Si exceeds 5%, the sintering procedure difficulty would be increased.

The term "powder sintered porous metal" in the present invention refers to the porous metal prepared by pressing raw materials and sintering. In the powder sintered porous metal stated above, Cu and Ni can be introduced into the powder sintered porous metal by Cu element powders and Ni element powders doped in the raw material powders, and can also be introduced into the powder sintered porous metal by Cu—Ni alloy powders in the raw material powders.

However, it is highly recommended the means of adopting Cu element powders and Ni element powders in the present invention. Through experiments, it is surprisingly discovered that, when using Cu element powders and Ni element powders, Cu and Ni diffuse between each other during sintering, thereby resulting in that the tortuosity factor of the obtained powder sintered porous metal reaches 1.02-1.25; whereas when using Cu—Ni alloy powders, the tortuosity factor of the obtained powder sintered porous metal is at least 1.6.

In addition to the porosity and the average pore diameter, the "tortuosity factor" is another important structure parameter reflecting the pore structure of the material. The "tortuosity factor" is defined by the ratio of the shortest distance through which the fluid flows over the porous body to the thickness of the porous body, and represents the curvature degree of the three dimensional interconnected pores in the porous body. If the tortuosity factor is closer to 1, it is indicated that the shortest distance through which the fluid flows over the porous body is shorter, and the permeation rate is faster. Therefore, in the case of closer porosity and average pore diameter, the powder sintered porous metal obtained by the means of using Cu element powders and Ni element powders has significantly improved permeability and backflushing regeneration ability.

Obviously, in view that the relationship among Cu element powders, Ni element powders and the tortuosity factor is revealed as stated above, thus in addition, a method for improving the permeability of the powder sintered porous metal is provided in the present as following: the powder sintered porous metal has a porosity of 25-60% and an average pore diameter of 0.5-50 μm, and consists of 23-40 wt % of Cu, 0-5 wt % of Si and the balance of Ni; wherein, Cu and Ni are introduced into the powder sintered porous metal by Cu element powders and Ni element powders doped in the raw material powder respectively, the raw material powders are pressed and then sintered, thereby preparing and obtaining the powder sintered porous metal, and Cu and Ni diffuse between each other during sintering, thereby resulting in that the tortuosity factor of the obtained powder sintered metal porous body reaches 1.02-1.25.

The filter element provided in the present invention is the filter element containing the powder sintered porous metal stated above. "Containing the powder sintered porous metal stated above" specifically refers to that, the filter element can consist of the powder sintered porous metal stated above; or the powder sintered porous metal stated above can only be used as a support layer of the filter element, wherein the surface of the support layer is further attached with a working layer for filtration, and so on.

When the support layer is attached with the working layer, the working layer is most preferred to be one of a nickel porous membrane or a nickel-based alloy porous membrane. In this way, both of the working layer and the support layer are nickel-based metal materials, thus, the binding performance between the two layers is very good, the detachment caused by the reasons of repeated backflushing regeneration and the like would not happen, and the long service life of the filter element can be maintained. The "nickel-based alloy porous membrane" comprises the porous membrane with the same chemical components as that of the powder sintered metal porous body of the present invention.

The steps of a specific method for preparing the powder sintered metal porous body of the present invention comprise: 1) mixing the powders: mixing Cu element powders with a particle size of −250~+400 mesh and Ni element powders with a particle size of −200~+300 mesh according to the proportion of that, in the prepared powder sintered porous metal, the weight percentage content of Cu is 23-40%, and the rest is Ni; 2) granulation, drying and forming: successively granulating and drying the mixed powders containing Cu and Ni powders stated above, setting the drying temperature at 40-60° C. and the drying time for 4-8 hours, then cold pressing with the pressure of 80-200 MPa for 20-80 seconds, and obtaining a compact; 3) sintering: placing the compact into a sintering furnace for sintering, wherein the sintering schedule includes the following three stages: the first stage: raising the sintering temperature from room temperature to 400-450° C., controlling the temperature-rising rate at 5-10° C./min, and keeping temperature at 400-450° C. for 120-240 minutes; the second stage: raising the sintering temperature to 750-850° C., controlling the temperature-rising rate at 5-10° C./min, and keeping temperature at 750-850° C. for 90-180 minutes; and the third stage: raising the sintering temperature to 1000-1200° C., controlling the temperature-rising rate at 3-5° C./min, and keeping temperature at 1000-1200° C. for 180-300 minutes; and obtaining the powder sintered porous metal by furnace cooling after sintering. The powder sintered porous metal consists of Cu and Ni elements, and the tortuosity factor of the powder sintered porous metal reaches 1.02-1.25.

The steps of another specific method for preparing the powder sintered metal porous body of the invention comprise: 1) preparing the mixed powders: mixing Cu element powders with a particle size of −250~+400 mesh, the Si element powders with a particle size of 3~10 μm and Ni element powders with a particle size of −200~+300 mesh according to the proportion of that, in the prepared powder sintered metal porous body, the weight percentage content of Cu is 23-40%, the weight percentage content of Si is 0.5-4%, and the rest is Ni; 2) granulation, drying and forming: successively granulating and drying the mixed powder materials containing Cu powders, Si powders and Ni powders stated above, setting the drying temperature at 40-60° C. and the drying time for 4-8 hours, then pressing with the pressure of 100-200 MPa for 20-80 second, and obtaining a compact; 3) sintering: placing the compact into a sintering furnace for sintering, wherein the sintering schedule includes the following three stages: the first stage: raising the sintering temperature from room temperature to 400-450° C., controlling the temperature-rising rate at 5-10° C./min, and keeping temperature at 400-450° C. for 120-180 minutes; the second stage: raising the sintering temperature to 750-850° C., controlling the temperature-rising rate at 5-10° C./min, and keeping temperature at 750-850° C. for 120-240 minutes; and the third stage: raising the sintering temperature to 1000-1200° C., controlling the temperature-rising rate at 3-5° C./min, and keeping temperature at 1000-1200° C. for 180-300 minutes; and obtaining the powder sintered porous metal by furnace cooling after sintering. The powder sintered porous metal consists of Cu, Si and Ni elements, and the tortuosity factor of the powder sintered metal porous body reaches 1.02-1.25.

The powder sintered porous metal of the present invention has the following beneficial technical effects of that:

1) the powder sintered porous metal has good mechanical properties and machinability, and the tensile strength can reach at least 80 MPa;

2) the powder sintered porous metal has excellent corrosion resistance in acid medium, especially in hydrofluoric acid medium, good corrosion resistance to the hot concentrated alkali liquid, and good corrosion resistance to neutral solutions, fluorine gas, water, sea water, air, organic compounds and so on;

3) in particular surprisingly, when Cu and Ni are introduced into the powder sintered porous metal by Cu element powders and Ni element powders doped in the raw material powders, the sintered porous metal has significantly improved permeability and backflushing regeneration property.

DETAILED EMBODIMENTS

Hereinafter, the method for preparing the powder sintered metal porous body and the powder sintered metal porous body obtained by these methods are described in detail through experiments. Through these descriptions, a person skilled in the art can clearly recognize the prominent features owned by the powder sintered metal porous body of the present application. The numbers of experimental examples referred to hereinafter are in accordance with the numbers of the corresponding "compacts" and "samples".

1 Materials Preparing Process

As shown in Table 1, in order to describe the powder sintered metal porous body of the present invention and the preparation for same, the following two classes of experiments, that is, "Experiment Class A" and "Experiment Class B", are prepared. Experiment Class A is divided into three groups of experiments, that is, "A1", "A2" and "A3", and Experiment Class B is also divided into three groups of experiments, that is, "B1", "B2" and "B3". The ratios of Cu to Ni are same in the raw materials of Experiment A1 and Experiment B1, and the difference is that, Experiment A1 adopts Cu element powders and Ni element powders, whereas Experiment B1 adopts Cu—Ni alloy powders; the ratios of Cu, Ni and Si are same in the raw materials of Experiment A2 and Experiment B2, and the difference is that, Experiment A2 adopts Cu element powders, Si element powders and Ni element powders, whereas Experiment B2 adopts Cu—Ni alloy powders and Si element powders; and similarly, the ratios of Cu to Ni are same in the raw materials of Experiment A3 and Experiment B3, and the difference is that, Experiment A3 adopts Cu element powders and Ni element powders, whereas Experiment B3 adopts Cu—Ni alloy powders. In order to accurately reflect the value of the tortuosity factor of the powder sintered porous metal obtained by Experiment Class A, Experiment A1 includes three parallel experiments, that is, "A1-1", "A1-2" and "A1-3", and the tortuosity factor of Experiment A1 will take the average value of the samples A1-1, A1-2 and A1-3; Experiment A2 includes three parallel experiments, that is, "A2-1", "A2-2" and "A2-3", and the tortuosity factor of Experiment A2 will take the average value of the samples A2-1, A2-2 and A2-3; and similarly, Experiment A3 includes three parallel experiments, that is, "A3-1", "A3-2" and "A3-3". As adopted in Table 1, the particle size of Cu element powders is −250~+400 mesh, the particle size of Ni element powders is −200~+300 mesh, the particle size of the Si element powders is 3-10 μm, and the particle size of Cu—Ni alloy powders is −200~+300 mesh.

1.1 the Sintering Schedule of Experiment Class A

The sintering schedule of Experiment Class A includes the following three stages: the first stage: raising the sintering temperature from room temperature to 400-450° C., controlling the temperature-rising rate at 5-10° C./min, and keeping temperature at 400-450° C. for 120-240 minutes; the second stage: raising the sintering temperature to 750-850° C., controlling the temperature-rising rate at 5-10° C./min, and keeping temperature at 750-850° C. for 90-180 minutes; and the third stage: raising the sintering temperature to 1000-1200° C., controlling the temperature-rising rate at 3-5° C./min, and keeping temperature at 1000-1200° C. for 180-300 minutes. The powder sintered porous metal is then obtained by furnace cooling after sintering, wherein,

TABLE 1

The components and content of the raw materials adopted in the experiments

| Experiment Class A | | | | | Experiment Class B | | |
|---|---|---|---|---|---|---|---|
| | Materials components | | | | | Materials components | |
| Experiment Number | | Cu element powders | Si element powders | Ni element powders | Experiment Number | Cu—Ni alloy powders | Si element powders |
| A1 | A1-1 | 25% | x | 75% | B1 | 100% | x |
|  | A1-2 | 25% | x | 75% |  |  |  |
|  | A1-3 | 25% | x | 75% |  |  |  |
| A2 | A2-1 | 30% | 4% | 66% | B2 | 96% | 4% |
|  | A2-2 | 30% | 4% | 66% |  |  |  |
|  | A2-3 | 30% | 4% | 66% |  |  |  |
| A3 | A3-1 | 40% | x | 60% | B3 | 100% | x |
|  | A3-2 | 40% | x | 60% |  |  |  |
|  | A3-3 | 40% | x | 60% |  |  |  |

Note:
"x" represents free of the component.

The raw materials of the experiments are mixed respectively according to that listed in Table 1. After thoroughly mixing, in order to prevent segregation, the raw material powders of each other experiments except Experiments B1 and B3 are granulated and then dried with a drying temperature set at 55° C. and drying time set for 6 hours. Next, the raw material powders of each experiment are respectively filled into isostatic pressing molds with a unified specification. Then, these molds are respectively positioned in a cold isostatic pressing machine and kept under a pressure of 100 MPa for 60 seconds, and the tubular compacts with corresponding numbers are then prepared after demolding. Next, these compacts are filled into sintering boats respectively, and these sintering boats are positioned into the sintering furnace for sintering and furnace cooled after sintering, and finally, the samples with corresponding numbers are taken out from each sintering boat.

the main purpose of the first stage is to degrease; the second stage is a medium temperature solid solution stage, and the main purpose is to promote the solid solution reaction between the elements; and the third stage is a component homogenization stage, and the main purpose is to obtain structure uniformity and final properties. The sintering procedure stated above can adopt inert gas-protecting sintering or vacuum sintering.

The sintering process parameters of the three stages in the sintering schedule of Experiment Class A are shown in Table 2 in detail. In Table 2, the unit of temperature-rising rate is ° C./min, and the unit of sintering time is minute.

TABLE 2 the sintering schedule of Experiment Class A

| | The first stage | | | The second stage | | | The third stage | | |
|---|---|---|---|---|---|---|---|---|---|
| Experimental Number | temperature-rising rate | Raising temperature to (° C.) | Time for holding temperature | temperature-rising rate | Raising temperature to (° C.) | Time for holding temperature | temperature-rising rate | Raising temperature to (° C.) | Time for holding temperature |
| A1 | 5 | 450 | 120 | 5 | 800 | 180 | 3 | 1150 | 120 |
| A2 | 5 | 450 | 120 | 5 | 800 | 180 | 3 | 1150 | 120 |
| A3 | 5 | 450 | 120 | 5 | 800 | 180 | 3 | 1150 | 120 |

1.2 the Sintering Schedule of Experiment Class B

The sintering schedule of Experiment Class B is relatively simpler (due to adopt the alloy powders), and is specifically gradually raising the sintering temperature from room temperature to 1200° C., controlling the temperature-rising rate at 5° C./min, and keeping temperature at 1200° C. for 2 hours.

2 Materials Properties Measurements

All of the crystalline phases of Sample A1 (comprising A1-1, A1-2 and A1-3), Sample A2 (comprising A2-1, A2-2 and A2-3), Sample A3 (A3-1, A3-2 and A3-3), Sample B1, Sample B2 and Sample B3 are (Cu, Ni) solid solutions. Si is interstitially solid dissolved in the Cu—Ni alloy. Thus, the tensile strength of these samples is higher, and can substantially reach at least 80 MPa.

wherein, $\theta$ is the open porosity of the porous material (%), D is the average pore diameter (m), K is the permeability ($m^3 \cdot m^{-2} \cdot s^{-1} \cdot Pa^{-1}$), L is the material thickness, and $\eta$ is the fluid viscosity (Pa•s).

The data of the thickness, open porosity, average pore diameter, permeability and fluid viscosity are obtained, and then the tortuosity factor can be obtained according to the equation (3). The fluid viscosity is calculated according to Nitrogen fluid viscosity at 20° C.

TABLE 3 the measurements of the pore structures of the samples

| | | | Experiment Class A | | | | | | Experiment Class B | | | |
|---|---|---|---|---|---|---|---|---|---|---|---|---|
| Item Number | | Thickness | open porosity | Average pore diameter | Porosity | Permeability | Tortuosity factor | Item Number | Thickness | open porosity | Average pore diameter | Porosity | Permeability | Tortuosity factor |
| A1 | A1-1 | 1.33 | 33.7 | 12.33 | 45 | 5.58 | 1.23 | B1 | 1.68 | 27.5 | 12.3 | 35 | 3.18 | 1.67 |
|    | A1-2 | 1.57 | 33.9 | 13.67 | 48 | 6.49 | 1.10 | | | | | | | |
|    | A1-3 | 1.60 | 33.5 | 11.80 | 43 | 4.63 | 1.13 | | | | | | | |
| A2 | A2-1 | 1.73 | 38.5 | 12.93 | 51 | 5.71 | 1.13 | B2 | 1.75 | 28.2 | 11.8 | 36 | 3.44 | 1.58 |
|    | A2-2 | 1.84 | 39.0 | 11.53 | 52 | 5.78 | 1.12 | | | | | | | |
|    | A2-3 | 1.99 | 37.0 | 12.1  | 50 | 5.50 | 1.13 | | | | | | | |
| A3 | A3-1 | 2.15 | 43.6 | 12.3  | 56 | 6.47 | 1.11 | B3 | 1.60 | 26.8 | 13.2 | 34 | 3.19 | 1.62 |
|    | A3-2 | 2.29 | 44.5 | 12.7  | 57 | 6.60 | 1.12 | | | | | | | |
|    | A3-3 | 1.81 | 42.7 | 12.42 | 55 | 6.33 | 1.14 | | | | | | | |

The pore structure measurement results of these samples stated above are shown in Table 3. In Table 3, the unit of thickness is mm, the unit of open porosity is %, the unit of average pore diameter is μm, the unit of porosity is %, and the unit of permeability is ($10^{-5} \cdot m^3 \cdot m^{-2} \cdot s^{-1} \cdot Pa^{-1}$). The measurements of the porosity, the open porosity, and the average pore diameter of the materials adopt the bubbling method; and the permeability specifically is nitrogen (20° C.) flux on a filtering area of 1 square meter under a filtration pressure difference of 1 pa for 1 second.

<As for Tortuosity Factor>

1) The definition of the tortuosity factor:

$$\tau = \frac{L'}{L} \quad (1)$$

wherein, L is the material thickness, L' is the shortest distance through which the fluid flows over the porous medium.

2) The Characterization Means for the Tortuosity Factor:

On the basis of the Darcy law, Kozeny law and Hagen-poiseuille law, it is concluded the quantitative relationship between the tortuosity factor and the relevant pore structure parameters (laminar flow process):

$$K = \frac{\theta D^2}{32 \eta \tau L}, \quad (2)$$

thereby obtaining $$\tau = \frac{\theta D^2}{32 K \eta L} \quad (3)$$

All of the corrosion resistance measurement results of Sample A1 (comprising A1-1, A1-2 and A1-3), Sample A2 (comprising A2-1, A2-2 and A2-3), Sample A3 (comprising A3-1, A3-2 and A3-3), Sample B1, Sample B2 and Sample B3 are shown in Table 4, wherein, the "corrosion resistance 1" is specifically characterized by the weight loss rate after being immersed into a hydrofluoric acid solution with a mass fraction of 5% at room temperature for 20 days; and the "corrosion resistance 2" is specifically characterized by the weight loss rate after being immersed into a hydrofluoric acid solution with a mass fraction of 5% (further containing 0.1-0.5 mol/L of $Fe^{3+}$ in the solution) at room temperature for 20 days.

TABLE 4 the corrosion resistance measurement results of the samples

| | | Experiment Class A | | | Experiment Class B | |
|---|---|---|---|---|---|---|
| | | Item | | | Item | |
| Number | | Corrosion resistance 1 | Corrosion resistance 2 | Number | Corrosion resistance 1 | Corrosion resistance 2 |
| A1 | A1-1 | 0.73 | 0.83 | B1 | 0.76 | 0.85 |
|    | A1-2 | 0.72 | 0.85 | | | |
|    | A1-3 | 0.74 | 0.88 | | | |
| A2 | A2-1 | 0.55 | 0.54 | B2 | 0.56 | 0.55 |
|    | A2-2 | 0.53 | 0.52 | | | |
|    | A2-3 | 0.52 | 0.55 | | | |
| A3 | A3-1 | 0.75 | 0.85 | B3 | 0.77 | 0.87 |
|    | A3-2 | 0.72 | 0.84 | | | |
|    | A3-3 | 0.73 | 0.86 | | | |

As shown in Table 4, the weight loss rates of all samples after being immersed into the hydrofluoric acid solution with the mass fraction of 5% at room temperature for 20 days are below 1%; and when the sample contains Si, not only are better properties exhibited by the indicator of "corrosion resistance 1", but also excellent properties are exhibited by the indicator of "corrosion resistance 2" (oxidizing medium system). The present invention suggests that the preferable Si content should be 2%, 2.5%, 3% or 4%.

The invention claimed is:

1. A powder sintered porous metal:
   formed by sintering 23-40 wt % of elemental Cu powder together with 0-5 wt % of elemental Si powder and elemental Ni powder as the remaining at a temperature above a melting point of elemental Cu but below a melting point of elemental Ni so that the sintered porous metal has grains of elemental Ni sintered together by melted elemental Cu,
   the powder sintered porous metal having a porosity of 40-60% and an average pore diameter of 0.5-50 µm;
   which is characterized in that, the powder sintered metal porous body consists of 23-40 wt % of elemental Cu powder, 0-5 wt % of elemental Si powder, and elemental Ni powder as the remaining,
   which has a weight loss rate of at most 1% after being immersed into a hydrofluoric acid solution with a mass fraction of 5% at room temperature for 20 days; and
   which has a tortuosity factor of 1.02-1.25, wherein the tortuosity factor is calculated using the formula $$\tau = \frac{\theta D^2}{32\,K\eta L},$$

where τ represents the tortuosity factor, θ represents an open porosity of the porous body, D represents an average pore diameter, K represents a permeability, η represents a fluid viscosity, and L represents a thickness of the porous body.

2. The powder sintered porous metal according to claim 1 is characterized in that, the powder sintered porous metal consists of 23-40 wt % elemental Cu powder and elemental Ni powder as the remaining, wherein the crystalline phase of the powder sintered metal porous body is a (Cu, Ni) solid solution.

3. The powder sintered porous metal according to claim 1 is characterized in that, the powder sintered porous metal contains 0.5-4 wt % of elemental Si powder.

4. The powder sintered porous metal according to claim 1 is characterized in that, the tortuosity factor of the powder sintered porous metal reaches at most 1.10.

5. The powder sintered porous metal according to claim 1 is characterized in that, the average pore diameter of the powder sintered porous metal is 1-20 µm.

6. A method of making the sintered metal of claim 1, the method comprising:
   (a) mixing 23-40 wt % of elemental Cu powder of −250-+400 mesh, 60-77 wt % of elemental Ni powder of −200-+300 mesh, and up to 5 wt % of elemental Si powder with a particle size of 3-10 µm to form a mixed powder;
   (b) granulating and drying the mixed powder at a drying temperature of 40-60° C. for 4-8 hours to form a dry mixed powder;
   (c) pressing the dry mixed powder with a pressure of 100-200 MPa for 20-80 seconds to obtain a compact sheet;
   (d) sintering the compact sheet in a sintering furnace in three stages:
       (i) a first stage comprising sintering at 400-450° C. for 120-180 minutes, with a first rate of temperature change being 5-10° C./min;
       (ii) a second stage comprising sintering at 750-850° C. for 120-240 minutes, with a second rate of temperature change being 5-10° C./min;
       (iii) a third stage comprising sintering at 1000-1200° C. for 180-300 minutes; with a third rate of temperature change being 3-5° C./min;
   (e) to form a sintered sheet; and
   (f) cooling the sintered sheet to form the sintered porous metal, wherein
       the sintered porous metal has a porosity between 40-60% and an average pore diameter of 0.5-50 µm.

7. The method for making a sintered porous metal of claim 6 wherein the metal is resistant to corrosion, characterized by a weight loss of at most 1% after being immersed into a hydrofluoric acid solution with a mass fraction of 5% at room temperature for 20 days.

8. The method for making a sintered porous metal of claim 6 wherein the metal has a tortuosity factor of 1.02-1.25, wherein the tortuosity factor is calculated using the formula $$\tau = \frac{\theta D^2}{32\,K\eta L},$$

where τ represents the tortuosity factor, θ represents an open porosity of the porous body, D represents an average pore diameter, K represents a permeability, η represents a fluid viscosity, and L represents a thickness of the porous body.

9. The method of making a sintered porous metal of claim 8 wherein the metal has a tortuosity factor of at most 1.10, wherein the tortuosity factor is calculated using the formula $$\tau = \frac{\theta D^2}{32\,K\eta L}.$$

10. The method of making a sintered porous metal of claim 6 wherein an average pore diameter of the sintered porous metal is 1-20 µm.

11. A sintered porous metal comprising:
    23-40 wt % of elemental Cu powder;
    60-77 wt % elemental Ni powder;
    with a porosity between 40-60 wt %; and
    an average pore diameter of 0.5-50 µm, wherein
    the sintered porous metal includes grains of elemental Ni powder sintered together by melted elemental Cu.

12. The sintered porous metal of claim 11 wherein the metal consists of 23-40 wt % of elemental Cu powder, 0.5-5 wt % of elemental Si powder, and 59.5-76.5 wt % elemental Ni powder.

13. The sintered porous metal of claim 12 wherein the metal is resistant to corrosion, characterized by a weight loss of at most 1% after being immersed into a hydrofluoric acid solution with a mass fraction of 5% at room temperature for 20 days.

14. The sintered porous metal of claim 11 wherein an average pore diameter of the powder sintered porous metal is 1-20 µm.

* * * * *